US011887794B2

(12) United States Patent
Viertel et al.

(10) Patent No.: US 11,887,794 B2
(45) Date of Patent: Jan. 30, 2024

(54) BREAKING DEVICE

(71) Applicant: ABB S.p.A., Milan (IT)

(72) Inventors: Julia Viertel, Västerås (SE); Zichi Zhang, Västerås (SE); James Mannekutla, Västerås (SE); Lars Jonsson, Västerås (SE); Alessio Bergamini, Gazzaniga (IT)

(73) Assignee: ABE, Milan (IT)

( * ) Notice: Subject to any disclaimer, the term of this patent is extended or adjusted under 35 U.S.C. 154(b) by 0 days.

(21) Appl. No.: 17/808,232

(22) Filed: Jun. 22, 2022

(65) Prior Publication Data

US 2023/0005682 A1 Jan. 5, 2023

(30) Foreign Application Priority Data

Jun. 30, 2021 (EP) .................................... 21182765

(51) Int. Cl.
*H01H 9/32* (2006.01)
*H01H 9/34* (2006.01)
(Continued)

(52) U.S. Cl.
CPC .............. *H01H 33/06* (2013.01); *H01H 9/32* (2013.01); *H01H 9/342* (2013.01); *H01H 9/36* (2013.01)

(58) Field of Classification Search
CPC .......... H01H 33/06; H01H 3/222; H01H 9/32; H01H 9/30; H01H 9/342; H01H 9/34; H01H 9/36
(Continued)

(56) References Cited

U.S. PATENT DOCUMENTS 2,128,999 A * 9/1938 Frank ........................ H01H 9/32 200/254
3,425,017 A * 1/1969 Schockelt ................ H01H 3/30 337/17
(Continued)

FOREIGN PATENT DOCUMENTS

CN 204270965 U 4/2015
DE 102013017381 A1 4/2015
EP 3709325 A1 9/2020

OTHER PUBLICATIONS

Extended European Search Report; Application No. 21182765.4; Completed: Nov. 10, 2021; dated Nov. 22, 2021; 5 Pages.

*Primary Examiner* — William A Bolton
(74) *Attorney, Agent, or Firm* — Whitmyer IP Group LLC

(57) ABSTRACT

A breaking device for interrupting current includes an electrically conducting outer member, an electrically conducting inner member arranged radially inside the outer member with respect to a breaking axis and an electrically insulating or semiconducting breaking member arranged radially between the outer member and the inner member with respect to the breaking axis, where the breaking member is arranged to move along the breaking axis from a starting position to a protruding position in which the breaking member protrudes from a space within the outer member for interrupting a current between the outer member and the inner member and the breaking member includes a first tubular including a first insulating material and a second insulating material, where the first insulating material has a higher wear resistance than the second insulating material.

18 Claims, 6 Drawing Sheets

(51) Int. Cl.
*H01H 9/36* (2006.01)
*H01H 33/06* (2006.01)

(58) Field of Classification Search
USPC .......................................... 218/62, 63, 67, 68
See application file for complete search history.

(56) References Cited

U.S. PATENT DOCUMENTS

| | | | | |
|---|---|---|---|---|
| 3,586,802 | A * | 6/1971 | Nichols | H01H 33/77 218/90 |
| 3,984,651 | A * | 10/1976 | Lewis | H01H 33/06 218/90 |
| 4,692,577 | A * | 9/1987 | Swanson | H01H 39/006 218/117 |
| 5,837,955 | A | 11/1998 | Utsumi et al. | |
| 6,518,865 | B1 * | 2/2003 | Al-Hosini | H01H 33/285 335/147 |
| 9,842,717 | B2 * | 12/2017 | Jeong | H01H 71/04 |
| 2020/0227220 | A1 | 7/2020 | Oehler et al. | |

* cited by examiner

BREAKING DEVICE

TECHNICAL FIELD

The present disclosure generally relates to breaking devices. In particular, a breaking device for interrupting current, is provided.

BACKGROUND

Breaking devices are important in a number of areas such as in power distribution systems.

EP 3709325 discloses one type of breaking device in the form of a tubular breaking device comprising an electrically conducting inner member arranged radially inside an electrically conducting outer member as well as an electrically insulating or semiconducting breaking tube arranged radially between the outer member and the inner member. The breaking tube separates the electrically conducting members from each other as well as squeezes an arc that is caused to be generated by the separation of the electrically conducting members from each other.

This breaking device generally functions well. However, after some time the squeezing effect of an electrical arc is gradually reduced, due to material loss of elements within the device. This may lead to an increase of the arc interruption time. It is eventually possible that a breaking failure occurs.

There is therefore a need for an improved breaking device.

SUMMARY

One object of the present disclosure is to provide a breaking device for interrupting current, which breaking device is more resilient to wear and with lower material losses.

A further object of the present disclosure is to provide a breaking device for interrupting current, which breaking device provides a fast interruption of current.

A further object of the present disclosure is to provide a breaking device for interrupting current, which breaking device provides a reliable interruption of current.

A still further object of the present disclosure is to provide a breaking device for interrupting current, which breaking device can be used multiple times to interrupt current.

A still further object of the present disclosure is to provide a breaking device for interrupting current, which breaking device solves several or all of the foregoing objects in combination.

According to one aspect, there is provided a breaking device for interrupting current, the breaking device comprising:

- an electrically conducting outer member;
- an electrically conducting inner member arranged radially inside the outer member with respect to a breaking axis; and
- an electrically insulating or semiconducting breaking member arranged radially between the outer member and the inner member with respect to the breaking axis, the breaking member being arranged to move along the breaking axis from a starting position to a protruding position in which the breaking member protrudes from a space within the outer member for interrupting a current between the outer member and the inner member by means of the breaking member;
- the breaking member comprising a first tubular element comprising a first insulating material and a second insulating material, where the first insulating material has a higher wear resistance than the second insulating material.

It is additionally possible that the first insulating material has a higher thermal resistance than the second insulating material.

As the first insulating material has a higher wear resistance and possibly also a higher thermal resistance than the second insulating material it is more robust in respect of wear and possibly also in respect of temperature. It is thereby more robust in respect of material erosion.

The first insulating material may be a refractory material such as a ceramic, for instance a ceramic in the group of nitrides (e.g. BN, $Si3N4$) or oxides (e.g. $Al2O3$, $SiO2$) or a silicate such as a calcium silicate or sodium silicate, a cement, such as Portland or alumina cement, bonded mica sheets or reinforced with glass fibers, like continuous or short glass fibers.

The second insulating material may be a polymer, for instance a thermoset or thermoplastic polymer, such as polyoxymethylene (POM), poly(methyl methacrylate) (PMMA), polyimide (PI), polyamide (PA) and/or a polyolefin, such as polypropylene (PP) or polymethylpentene (PMP) and/or or another such polymer.

The first insulating material may be provided as a coating on the second insulating material.

Alternatively, the first insulating material may be provided in a first area of the first tubular element and the second insulating material may be provided in a second area of the first tubular element.

The first area may cover a first part of the first tubular element comprising a first protruding end of the first tubular element and the second area may cover a second part of the first tubular element forming the rest of the first tubular element, where the first protruding end is the part of the first tubular element that first protrudes from the space when moving from the starting position to the protruding position.

The first protruding end may be placed in a first plane that is perpendicular to the breaking axis. The first tubular element may additionally have an outer surface and an inner surface, where the inner surface is closer to the breaking axis than is the outer surface.

In this case the first area may extend a first length along the breaking axis on the outer surface in a direction away from the first protruding end and may extend a second length along the breaking axis on the inner surface in a direction away from the first protruding end, where the first length is longer than the second length.

The breaking member may additionally comprise a second tubular element, where the first tubular element is an inner tubular element and the second tubular element is an outer tubular element joined to the outer surface of the inner tubular element, thereby defining a recess between the outer tubular element and the inner tubular element. The outer tubular element may comprise a third and a fourth insulating material, where the third insulating material has a higher wear resistance than the fourth insulating material.

The third insulating material may additionally have a higher thermal resistance than the fourth insulating material.

The first and the third insulating materials may be the same insulating material and the second and fourth insulating materials may be the same insulating material.

It is possible that the third insulating material is provided as a coating on the fourth insulating material.

Alternatively, the third insulating material may be provided in a third area of the outer tubular element and the fourth insulating material may be provided in a fourth area of the outer tubular element.

It is additionally possible that the third area covers a first part of the outer tubular element that comprises the second protruding end of the outer tubular element, that the fourth area covers a second part of the outer tubular element the makes up the rest of the outer tubular element and that the second protruding end is the part of the outer tubular element that first protrudes from the space when moving from the starting position to the protruding position.

The second protruding end may be placed in a second plane that is perpendicular to the breaking axis. The second tubular element may also have an outer surface and an inner surface, where the inner surface is closer to the breaking axis than is the outer surface.

In this case the third area may extend a third length along the breaking axis on the outer surface in a direction away from the second protruding end and may extend a fourth length along the breaking axis on the inner surface in a direction away from the second protruding end, where the third length is longer than the fourth length.

The breaking device may additionally comprise an arcing chamber comprising a breaker element receiving structure comprising at least one cavity, where each cavity has at least one wall and is provided for receiving a corresponding tubular element of the breaking member. The at least one cavity is thereby formed in a body of electrically insulating material. The cavity walls of the breaker element receiving structure may be of a fifth insulating material and a sixth insulating material, where the sixth insulating material has a higher wear resistance than the fifth insulating material.

The sixth insulating material may additionally have a higher thermal resistance than the fifth insulating material.

The fifth insulating material may be the same as the second insulating material and the sixth insulating material may be the same as the first insulating material.

A first part of a cavity wall adjacent a first contact area of the electrically conducting outer member may be of the sixth insulating material.

It is additionally possible that a second part of a cavity wall adjacent a second contact area of the electrically conducting inner member is of a seventh insulating material having a higher wear resistance than the fifth insulating material.

The seventh insulating material may additionally have a higher thermal resistance than the fifth insulating material. It is also possible that the seventh insulating material is the same as the first insulating material.

Each cavity may comprise an inner and an outer wall, where the inner wall is radially closer to the breaking axis than is the outer wall. The second cavity part adjacent the second contact area may in this case be provided in the inner wall of a first or inner cavity provided for receiving the first or inner tubular element, while the first cavity part adjacent the first contact area may be provided in the outer wall of a possible outer cavity for receiving the outer tubular element, if being present, and otherwise in the outer wall of the first cavity.

The space may be defined by a wall. In this case it is furthermore possible that a part of this wall located adjacent the first contact area of the electrically conducting outer member is made of an eighth insulating material that is the same as the first insulating material. The rest of the wall may be made of another insulating material, such as a polymer, like a polymer of any of the above-mentioned types.

The recess between the outer tubular element and the inner tubular element may be defined between an inner surface of the outer tubular element and the outer surface of the inner tubular element.

The outer tubular element may be joined to the inner tubular element at a joining area of the outer surface of the inner tubular element. The joining area may more particularly be formed as cylinder-shaped part of the outer surface of the inner tubular element around the breaking axis.

A bottom of the recess may be located in a third plane that is perpendicular to the breaking axis.

The inner tubular element may have a first protruding length, which may be a length between the first protruding end and the area where the outer tubular element is joined to the inner tubular element. The outer tubular element may in turn have a second protruding length that is the length between the second protruding end and the area where the outer tubular element is joined to the inner tubular element. Thereby the first protruding length of the inner tubular element may be the length of the inner tubular element along the breaking axis between the first plane and the third plane and the second protruding length of the outer tubular element may be the length of the outer tubular element along the breaking axis between the second plane and the third plane.

The second protruding end may be located between the first protruding end and the joining area in relation to the breaking axis.

The second protruding end may in one variation be substantially located midway between the joining area and the first protruding end in relation to the breaking axis. The second protruding end may thereby be substantially placed halfway between the first protruding end and the area where the outer tubular element is joined to the inner tubular element. Thereby the second plane with the second protruding end may be located essentially halfway between the first and the third planes. The distance between the second plane and the first plane may thereby also essentially be the same as the distance between the second plane and the third plane.

The second protruding end may in another variation be located closer to the joining area than to the first protruding end in relation to the breaking axis. Thereby the second plane with the second protruding end may be placed closer to the third plane than to the first plane. The distance between the second plane and the third plane may consequently be lower than the distance between the second plane and the first plane.

The second protruding end may in a further variation be located closer to the first protruding end than to the joining area in relation to the breaking axis. The second plane may thereby be located closer to the first plane with the first protruding end than to the third plane with the bottom of the recess. This also means that the distance between the second plane and the first plane may be lower than the distance between the second plane and the third plane.

The inner cavity may be shaped for receiving the first protruding length of the inner tubular element and the outer cavity may be shaped for receiving the second protruding length of the outer tubular element.

Through the existence of the inner and outer cavities, there is also formed a wall between them, which wall mates with the recess between the inner and outer tubular elements. A tip of the wall may more particularly be adapted to mate with the bottom of the recess.

It is furthermore possible that in the protruding position the first protruding end of the inner tubular element is arranged to abut the bottom of the inner cavity, the second protruding end of the outer tubular element is arranged to abut the bottom of the outer cavity and/or the bottom of the recess being arranged to abut the tip of the wall separating the inner cavity from the outer cavity.

The device may further comprise at least one vent opening for venting the arcing chamber when the breaking member has moved from the starting position, where each vent opening leads to one of the cavities. In this case it is possible that at least one first radial vent opening leads to the inner cavity. It is additionally or instead possible that at least one second radial vent opening leads to the outer cavity. Each radial vent opening may additionally lead to a cavity via a vent channel.

The outer member, the inner member, the inner tubular element, and the outer tubular element may be substantially concentric with the breaking axis.

The breaking device may further comprise an actuator arranged to force the breaking member from the starting position to the protruding position.

The breaking device may additionally comprise a contact arrangement comprising a moveable contact element, which contact arrangement is configured to selectively electrically disconnect the outer member and the inner member. The contact arrangement may more particularly be configured to electrically disconnect the outer member and the inner member during movement of the breaking member from the starting position towards the protruding position.

The breaking member provides an electrical potential barrier between the outer member and the inner member. Due to the shape of the breaking member, the arc can be effectively trapped by movement of the breaking member from the starting position to the protruding position.

As the breaking member moves from the starting position, an arc path between the inner member and the outer member is lengthened. The extended length of the arc path may eventually cause the arc to be extinguished. Thereby, a circuit comprising the breaking device can be opened. The starting position and the protruding position of the breaking member may thus correspond to a closed position and an open position, respectively, of the breaking device.

Since the breaking device comprises a breaking member with tubular elements, the breaking device constitutes a tubular breaker. The breaking device may be used for AC and DC applications, e.g. in low voltage and medium voltage ranges. The breaking device may be active or passive (i.e., not requiring auxiliary power other than from an applied circuit source). The breaking device according to the present disclosure may for example be implemented as a switching device, a power device, a commutation switch, a disconnector, a passive DC breaker, a passive AC breaker, a load switch, or a current limiter.

The breaking member may further be arranged to move back along the breaking axis from the protruding position to the starting position. The breaking device may be configured to interrupt current multiple times.

The inner member may be connected to an inner electrical contact of an electrical circuit and the outer member may be connected to an outer electrical contact of the electrical circuit. The outer member and the inner member may be of various shapes, for example tubes, bars, or rods. The outer member and the inner member may be of the same type of shape or of different types of shapes.

The outer member and/or the inner member may be an electrically conducting tube.

The outer member, the inner member and the breaking member may be substantially concentric, or concentric, with the breaking axis. In this case, a triaxial breaking device is formed.

The contact arrangement may be configured to electrically disconnect the outer member and the inner member during movement of the breaking member from the starting position towards the protruding position. The breaking member may push, or otherwise actuate, the moveable contact element of the contact arrangement when moving from the starting position towards the protruding position, to electrically disconnect the outer member and the inner member.

BRIEF DESCRIPTION OF THE DRAWINGS

Further details, advantages and aspects of the present disclosure will become apparent from the following embodiments taken in conjunction with the drawings, wherein.

DETAILED DESCRIPTION

Figure 1:
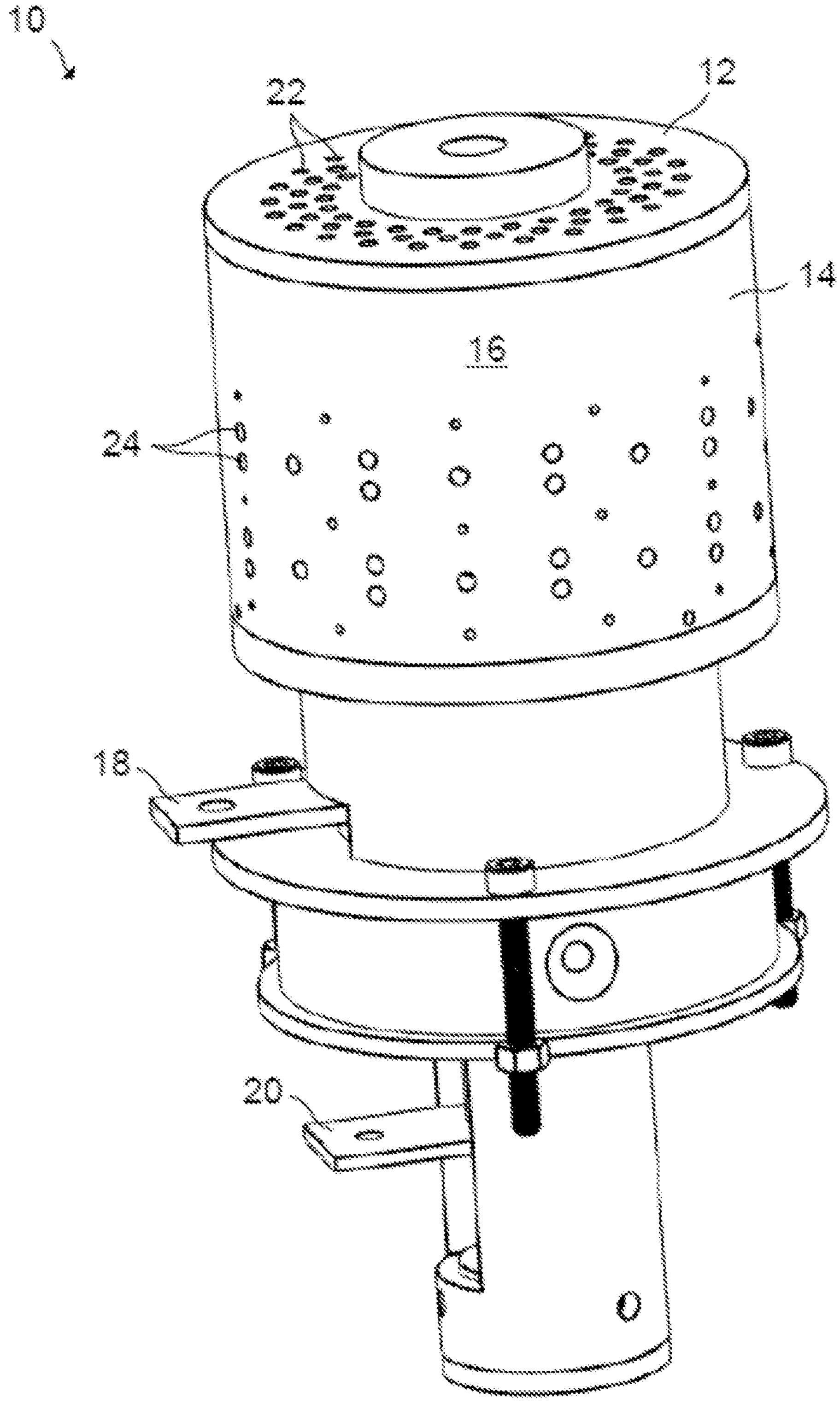
FIG. 1 schematically represents a perspective view of a breaking device.

In the following, a breaking device for interrupting current will be described. The same reference numerals will be used to denote the same or similar structural features.

FIG. 1 schematically represents a perspective view of a breaking device 10 configured to interrupt current. The breaking device 10 may be used for AC and DC applications, e.g. in low voltage and medium voltage ranges.

The breaking device 10 of this example comprises an end section 12 and a wall 14 providing a volume in which a breaking member receiving structure is arranged. The breaking member receiving structure is provided for receiving a breaking member and formed as a body of electrically insulating material. The end section 12, wall 14 and breaking member receiving structure together forms an arcing chamber 16. The breaking device 10 further comprises an outer electrical contact 18 and an inner electrical contact 20. A plurality of axial vent openings 22 are formed in the end section 12 and a plurality of radial vent openings 24 are formed in the wall 14.

Figure 2:
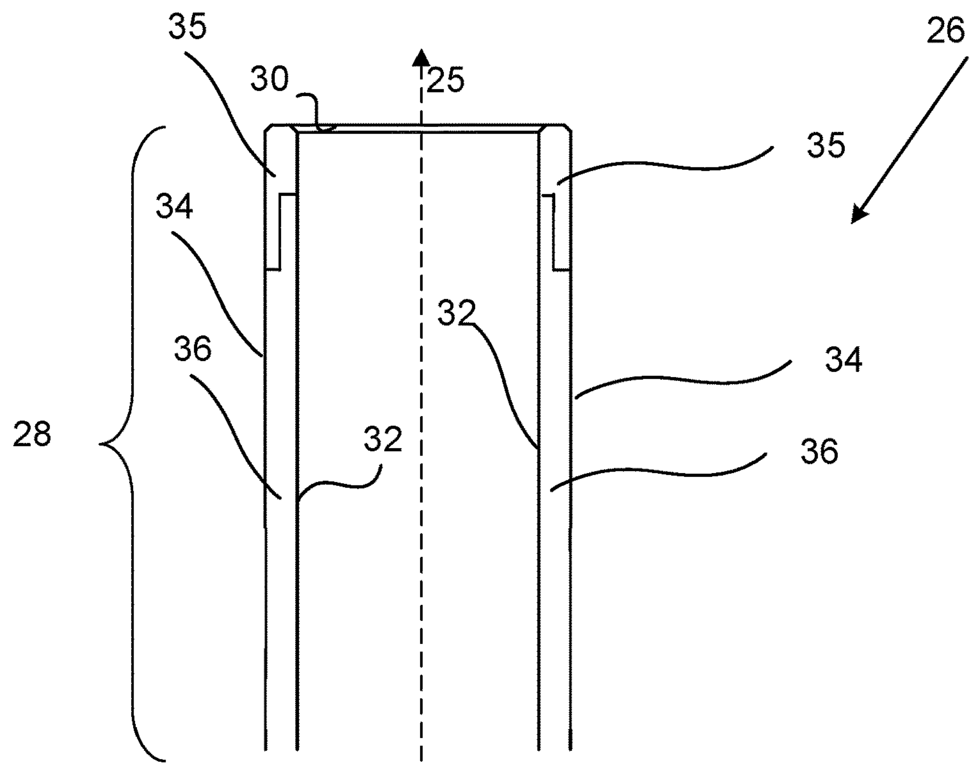
FIG. 2 schematically represents a cross-sectional side view of a first version of a breaking member of the breaking device.

FIG. 2 represents a cross-sectional side view of an electrically insulating or semiconducting breaking member 26 used in the breaking device 10. The breaking member 26 comprises a first tubular element 28 having an inner surface 32 and an outer surface 34, where the inner surface 32 is in the interior of the tubular element, while the outer surface 34 is the exterior of the tubular element. The tubular element 28 is furthermore centered around a breaking axis 25. Thereby the breaking member 26 is also concentric with the breaking axis 25. The inner surface 32 is also closer to the breaking axis 25 than is the outer surface 34.

The intention is that the breaking member 26 and thereby also the first tubular element 28 is to move along the breaking axis 25 when performing a current interruption action.

The first tubular element 28 comprises a first protruding end 30, which first protruding end 30 is placed in a first plane that is perpendicular to the breaking axis 25. In operation the first protruding end 30 is the part of the first tubular element 28 that first enters the arcing chamber. The first tubular element 28 comprises a first insulating material and a second insulating material, where the first insulating material has a higher wear resistance than the second insulating material. It may additionally have a higher thermal resistance than the second insulation material.

As the first insulating material has a higher wear resistance and possibly also a higher thermal resistance than the second insulating material it is more robust in respect of wear and optionally also temperature. It is thereby more robust in respect of material erosion. The first insulating material may be a refractory material, for instance a ceramic, such as a ceramic in the group of nitrides (e.g., BN, $Si_3N_4$) or oxides (e.g., $Al_2O_3$, $SiO_2$) or a silicate such as calcium silicate or sodium silicate. As an alternative the refractory material may be a cement, such as Portland or alumina cement. As yet another alternative, the refractory material may be bonded mica sheets. As a further example, the refractory material may be reinforced with glass fibers, like continuous or short glass fibers. The second insulating material may be a polymer, for instance a thermoset or thermoplastic polymer, such as polyoxymethylene (POM), poly(methyl methacrylate) (PMMA), polyimide (PI), polyamide (PA) and/or a polyolefin, such as polypropylene (PP) or polymethylpentene (PMP) and/or or another such polymer.

In the version shown in FIG. 2, the first tubular element 28 comprises a first area 35 with the first insulating material and a second area 36 with the second insulating material. The first area 35 covers a first part of the first tubular element 28 in which the first protruding end 30 is located, while the second area 36 covers a second part of the first tubular element 28 that makes up the remainder of the first tubular element 28.

In this case the first area 35 may extend a first length along the breaking axis 25 on the outer surface 34 in a direction away from the first protruding end 30. The first area may also extend a second length along the breaking axis 25 on the inner surface 32 in a direction away from the first protruding end 30. The first length is also longer than the second length. However, it should be realized that as an alternative the first length may be shorter than the second length.

As an alternative the whole of the first tubular element is made of the second insulating material on top which the first insulating material is applied as a coating. In this case the first insulating material would thus cover the whole of the first tubular element.

Figure 3:
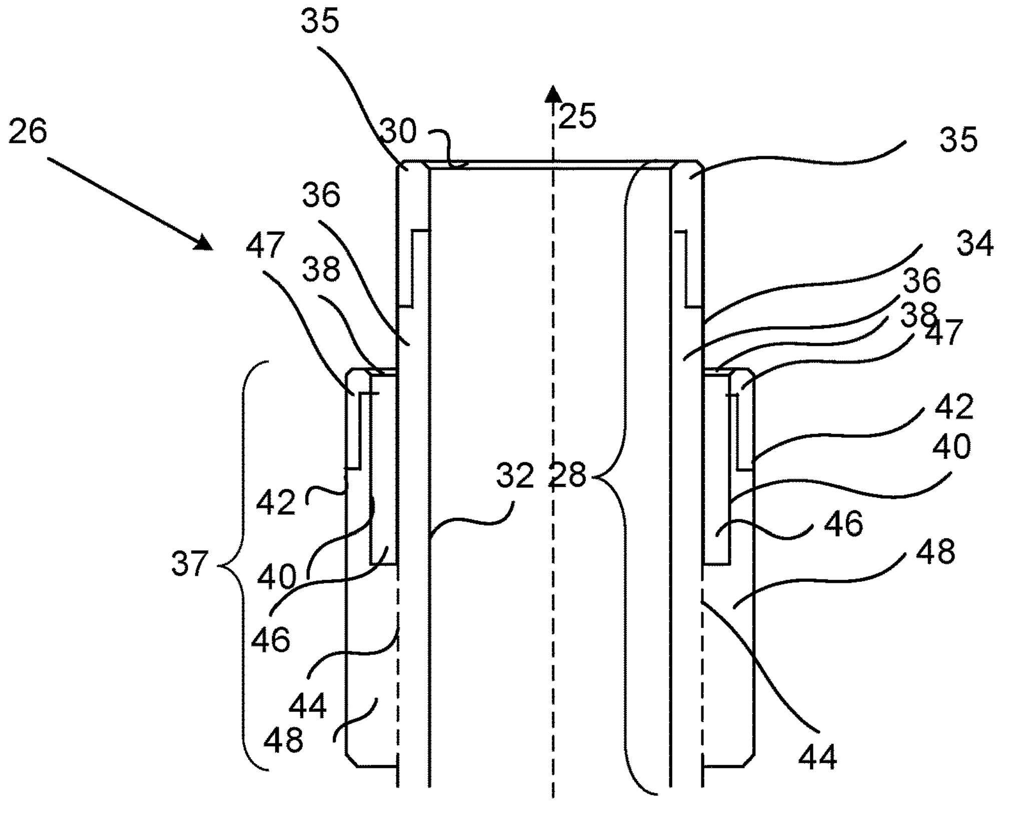
FIG. 3 schematically represents a cross-sectional side view of a second version of a breaking member of the breaking device.

FIG. 3 represents a cross-sectional side view of a second version of an electrically insulating or semiconducting breaking member 26 used in the breaking device 10.

The breaking member 26 comprises the first tubular element 28 as well as a second tubular element 37, where the first tubular element 28 is an inner tubular element and the second tubular element 37 is an outer tubular element. Both elements 28 and 37 are thus formed as tubes and the inner tubular element 28 has the previously mentioned inner surface 32 and outer surface 34. The outer tubular element 37 is similarly shaped and therefore has an inner surface 40 and an outer surface 42, where the inner surface 40 is in the interior of the tubular element 37, while the outer surface is on the exterior of the tubular element 37. The inner surface 40 of the outer tubular element 37 is closer to the breaking axis 25 than is the outer surface 42 of the outer tubular element 37. Both tubular elements 28 and 37 may have circular cross-sections and may be centered around and be concentric with the breaking axis 25. Thereby also this second version of the breaking member 26 is concentric with the breaking axis 25. The intention is also here that the breaking member 26 and thereby also the tubular elements 28 and 37 are to move along the breaking axis 25 when performing a current interruption action.

As in the first version, the inner tubular element 28 comprises the first protruding end 30 in the first plane that is perpendicular to the breaking axis 25. In a similar manner, the outer tubular element 37 comprises a second protruding end 38, which second protruding end 38 is placed in a second plane that is also perpendicular to the breaking axis 25. The second protruding end 38 is the part of the outer tubular element 37 that first enters the arcing chamber 14 when moving from the starting position to the protruding position.

The outer tubular element 37 is joined to the inner tubular element 28 at a joining area 44 of the outer surface 34 of the inner tubular element 28, where the joining area 44 may be formed as a cylinder-shaped part of the outer surface around the breaking axis 25. Thereby a recess 46 of circular shape is defined between the inner and outer tubular elements 37 and 28. The recess 46 is more particularly defined between the inner surface 40 of the outer tubular element 37 and the outer surface 34 of the inner tubular element 28.

The second protruding end 38 is located between the first protruding end 30 and the joining area 44 in relation to the breaking axis 25. The second plane with the second protruding end 38 is thereby placed along the breaking axis 25 between the first plane with the first protruding end 30 and a third plane in which a bottom of the recess 46 between the inner and outer tubular elements 28 and 37 is located. In the present example the second protruding end 38 is substantially placed halfway between the first protruding end 30 and the area where the outer tubular element 37 is joined to the inner tubular element 28, i.e. the second plane with the second protruding end is located halfway between the first and the third planes. The distance between the second plane and the first plane is thus essentially the same as the distance between the second plane and the third plane.

The inner tubular element 28 also has a first protruding length, which is a length between the first protruding end 30 and the area 44 where the outer tubular element 36 is joined to the inner tubular element 28 and the outer tubular element 37 has a second protruding length that is the length between the second protruding end 38 and the area 44 where the outer tubular element 37 is joined to the inner tubular element 28. Put differently the first protruding length of the inner tubular element 28 is the length along the breaking axis 25 between the first plane with the first protruding end 30 and the third plane with the bottom of the recess 46 and the second protruding length of the outer tubular element 37 is the length along the breaking axis 25 between the second plane with the second protruding end 38 and the third plane with the bottom of the recess 46.

Just as in the first variation, the inner tubular element 28 comprises the first insulating material and the second insulating material. Furthermore, the outer tubular element 37 comprises a third and a fourth insulating material, where the third insulating material has a higher thermal and wear resistance than the fourth insulating material. The third insulating material may as an example be the same as the first insulating material and may thus be a refractory material of any of the previously described types, while the fourth insulating material may be the same as the second insulating material and may be a polymer of any of the previously described types.

Figure 4:
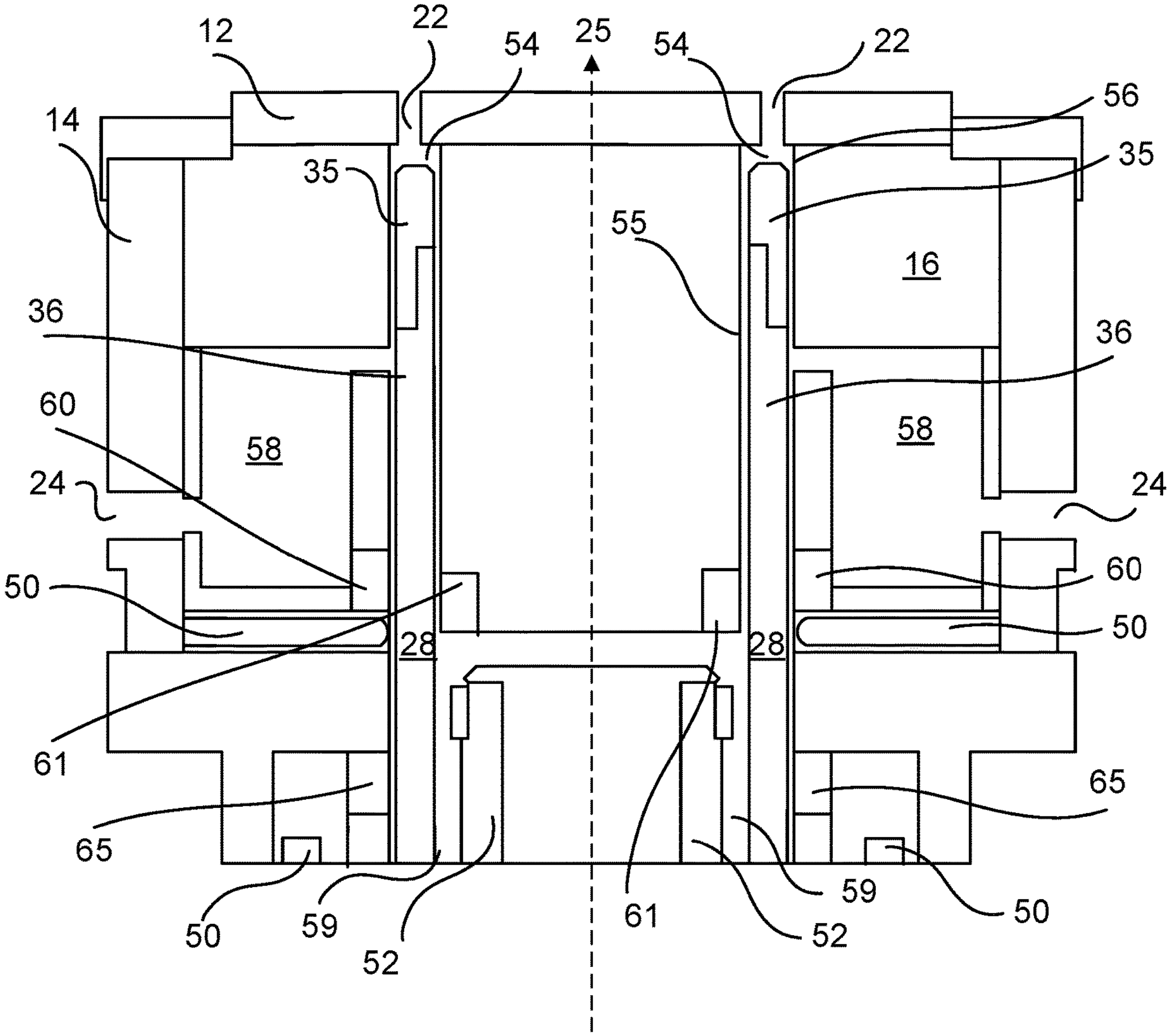
FIG. 4 schematically represents a cross-sectional side view of a part of the breaking device according to a first embodiment including the first version of the breaking member.

In the example in FIG. 4, the inner tubular element 28 comprises the first area 35 with a first insulating material and the second area 36 with the second insulating material, where again the first area 35 is in a part of the inner tubular element 28 that covers the first protruding end 30, with the second area 36 covering a second part forming the remainder of the inner tubular element 28. Also here, the first area 35 extends a first length along the breaking axis 25 on the outer surface 34 in a direction away from the first protruding end 30 as well as a second length along the breaking axis 25 on the inner surface 32 in a direction away from the first protruding end 30, where the first length is longer than the second length. However, it should be realized that also here the first length may be shorter than the second length.

In a similar manner, the outer tubular element 37 comprises a third area 47 with the third insulating material and a fourth area 48 with the fourth insulating material. The third area 47 is provided in a first part of the outer tubular element 37 that covers the second protruding end 38, while the fourth area 48 is provided in a second part of the outer tubular element 37 that makes up the remainder of the outer tubular element 37.

In this case the third area may extend a third length along the breaking axis 25 on the outer surface 42 in a direction away from the second protruding end 38 and may extend a fourth length along the breaking axis 25 on the inner surface 40 in a direction away from the second protruding end 38, where the third length is longer than the fourth length. It is here possible that the fourth length is longer than the third length.

Also, in this case it is possible that the whole of the inner tubular element is made of the second insulating material on top which the first insulating material is applied as a coating. In this case the first insulating material would thus cover the whole of the first tubular element. It is additionally or instead possible that the whole of the outer tubular element is made of the fourth insulating material on top which the third insulating material is applied as a coating. In this case the third insulating material would thus cover the whole of the second tubular element, where again the first and third insulating materials may be the same and the second and fourth insulating materials may be the same.

FIG. 4 represents a cross-sectional side view of a part of a breaking device according to a first embodiment, which breaking device comprises the arcing chamber 16 and the first version of the breaking member 26. In the figure the breaking member 26 is close to being in a protruding position. The arcing chamber 16 may be filled with air, gas, or other fluid.

The breaking member receiving structure in the arcing chamber 16 formed by the wall 14 and the end section 12 comprises a first cavity 54 for receiving the first tubular element 28. The cavity 54 may thus be formed in the body of electrically insulating material, which may be a polymer, like a thermoset or thermoplastic polymer, such as POM, PMMA, PI, PA, PP and/or PMP and/or or another such polymer. The bottom of the first cavity 54 may also be formed by the end section 12. The first cavity 54 has at least one wall surround the first tubular element 28. The first cavity may have an inner wall 55 facing the inner surface of the first tubular element 28 and an outer wall 56 facing the outer surface of the first tubular element 28. The inner wall 55 of the first cavity 54 is radially closer to the breaking axis 25 than is the outer wall 56 of the first cavity 54.

In the arcing chamber 16 there is furthermore at least one vent opening 22, 24 for venting the arcing chamber 16 when arc interruption takes place, where each vent opening leads to a corresponding cavity. As can be seen in the example in FIG. 4, a first group of axial vent openings 22 lead to the bottom of the inner cavity 54. It can also be seen that a first group of radial vent openings 24 also lead to the inner cavity 54 via corresponding vent channels 58. Each radial vent opening may thereby lead to a cavity via a vent channel. At least one first vent opening in the first group of radial vent openings thus leads to the inner cavity 54.

Each of the axial vent openings 22 and the radial vent openings 24 are constituted by through holes. The axial vent openings 22 extend from the interior of the arcing chamber 16 and through the end section 12. The radial vent openings 24 extend from the interior of the arcing chamber 16 and through the wall 14 via a vent channel 58. The vent openings 22, 24 are configured to vent the volume within the arcing chamber 16 when the breaking member 26 starts to move from a starting position.

As can also be seen in FIG. 4, the breaking device 10 comprises an electrically conducting outer member 50, an electrically conducting inner member 52 in addition to the breaking member 26, which may all be shaped as tubes or have tubular elements. The breaking device 10 may therefore be referred to as a tubular breaker.

The inner member 52 is arranged radially inside the outer member 50 with respect to the breaking axis 25. The breaking member comprising the first tubular element 28 is arranged radially between the outer member 50 and the inner member 52 with respect to the breaking axis 25.

In this example, each of the outer member 50 and the inner member 52 is an electrically conducting tube concentric with the breaking axis 25. Each of the outer member 50 and the inner member 52 has a circular cross-section. As the elements of the arc interrupting member are also tubular, the breaking device 10 is therefore a triaxial breaking device. One or both of the outer member 50 and the inner member 52 may however adopt shapes other than tubes. The outer member 50 is connected to the outer electrical contact 18 (not shown) and the inner member 52 is connected to the inner electrical contact 20 (not shown)

As shown in FIG. 4, a space 59 is defined between the outer member 50 and the inner member 52 and the breaking member 26 is moved from this space 59 into the arcing chamber 16 when moving from the starting position to the protruding position in order to interrupt an arc.

The majority of the breaking member receiving structure may for example be made of a fifth electrically insulating material, which may be the same as the second insulating material such as a polymer, like a thermoset or thermoplastic polymer, such as POM, PMMA PI, PA, PP and/or PMP. It is additionally possible that also the end section 12 and the wall 14 are made of the same material.

However, a first part 60 of a cavity wall adjacent a first contact area of the electrically conducting outer member 50 is in this first embodiment of a sixth insulating material having a higher wear resistance and possibly also a higher thermal resistance than the fifth insulating material. The first part 60 is in this first version of the breaking device a part of the outer wall 56 of the first cavity 54 adjacent the first contact area. It is in this case possible that the remainder of the outer wall of the first cavity 54 is made of the fifth insulating material.

Furthermore, a second part 61 of a cavity wall adjacent a second contact area of the electrically conducting inner member 52 may be of a seventh insulating material having a higher wear resistance and possibly also a higher thermal resistance than the fifth insulating material. The second part 61 adjacent the second contact area is in this case provided in the inner wall 55 of the first cavity 54. It is in this case possible that the remainder of the inner wall of the first cavity 54 is made of the fifth insulating material. The sixth and seventh materials may be the same. They may also be refractory materials such as ceramics, for instance ceramics in the group of nitrides (e.g., BN, $Si_3N_4$) or oxides (e.g., $Al_2O_3$, $SiO_2$) or silicates such as a calcium silicates or sodium silicates, cements, such as Portland or alumina cements, bonded mica sheets or reinforced with glass fibers, like continuous or short glass fibers. They may thereby also be the same as the first insulating material.

It should be realized that it is possible that the first cavity is only made of the fifth insulating material, in which case there are no first and second parts. It is additionally possible that the inner wall 55 of the first cavity 54 and/or the outer wall 56 of the first cavity 54 is made of the fourth insulating material, where the sixth insulating material is provided as a coating on the outer wall 56 of the first cavity 54 and/or the seventh insulating material is provided as a coating on the inner wall 55 of the first cavity 54.

Figure 5:
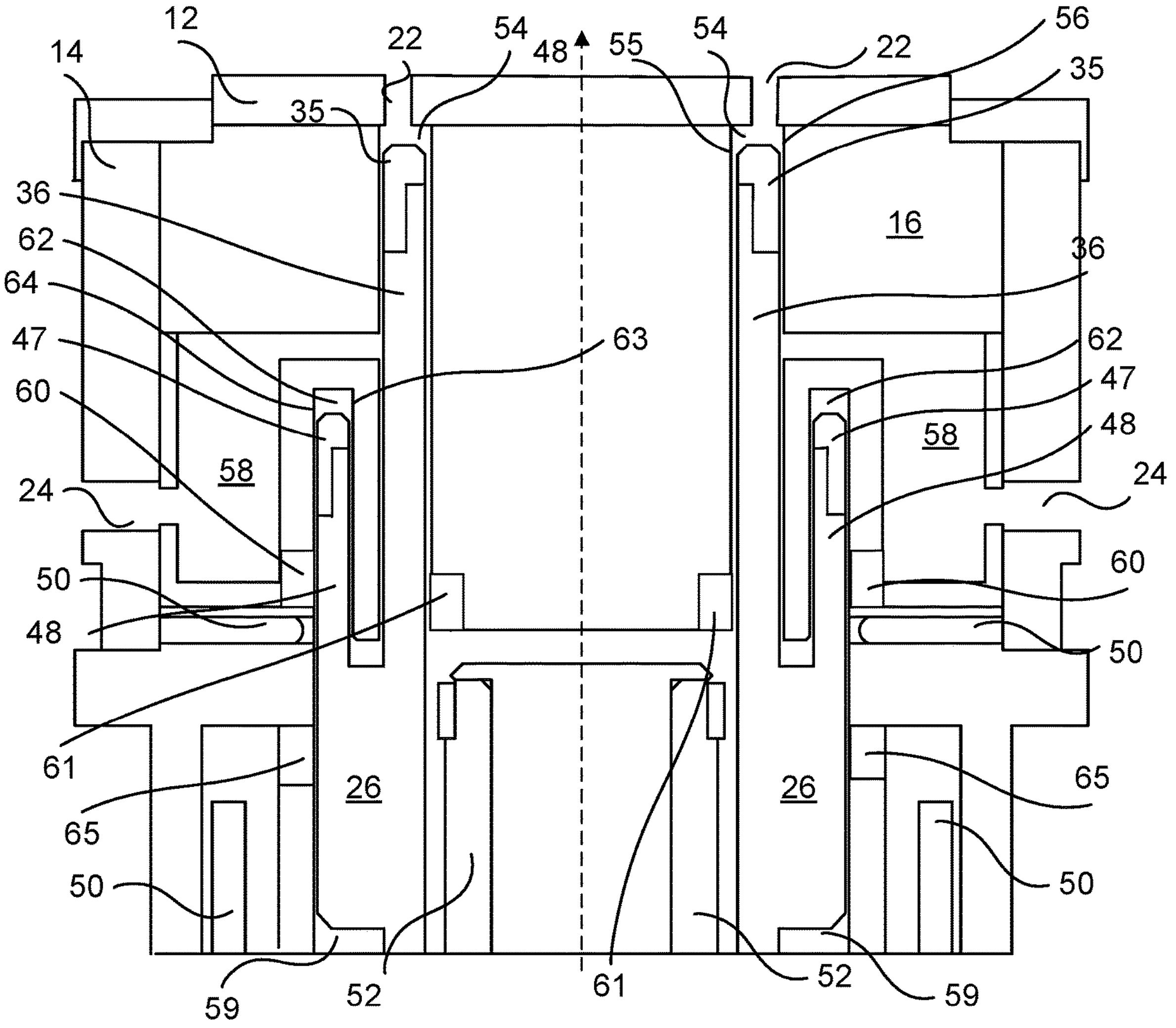
FIG. 5 schematically represents a cross-sectional side view of a part of the breaking device according to a second embodiment including the second version of the breaking member.

FIG. 5 represents a cross-sectional side view of a part of a second embodiment of the breaking device comprising the arcing chamber 16 and the second version of the breaking member 26, where the breaking member is close to being in a protruding position.

The breaking member receiving structure of the arcing chamber 16 in this case comprises the first cavity 54 for receiving the first or inner tubular element 28 of the breaking member 26. Thereby the first cavity 54 is also an inner cavity. The breaking member receiving structure in this case also comprises a second or outer cavity 62 for receiving the second or outer tubular element of the breaking member 26. The cavities 54 and 62 may thus be formed in the body of electrically insulating material, the majority of which may as was mentioned above may be a polymer, like a thermoset or thermoplastic polymer, such as POM, PMMA, PI, PA, PP and/or PMP. Both the cavities may be ring-shaped with a depth corresponding to the protruding length of the corresponding tubular element of the breaking member 26. The inner cavity 54 may more particularly be shaped for receiving the first protruding length of the inner tubular element 28. The inner cavity 54 may thereby have a depth in the direction along the breaking axis 25 that corresponds to the first protruding length of the inner tubular element. The bottom of the inner cavity 54 may in this case also be formed by the end section 12. As before, the inner cavity 54 has at least one wall surrounding the first tubular element 28. Again, the inner cavity 54 may have an inner wall 55 facing the inner surface of the inner tubular element 28 and an outer wall 56 facing the outer surface of the first tubular element 28.

The outer cavity 62 may in turn be shaped for receiving the second protruding length of the outer tubular element 37. The outer cavity 62 may thereby have a depth in the direction along the breaking axis 25 corresponding to the second protruding length of the outer tubular element of the breaking member 26. Also, the outer cavity 62 has at least one wall surrounding the second tubular element 37. The outer cavity 62 may have an inner wall 63 facing the inner surface 40 of the outer tubular element 37 and an outer wall 64 facing the outer surface 42 of the outer tubular element 37, where the inner wall 63 is radially closer to the breaking axis 25 than is the outer wall 64. Through the provision of the inner and outer cavities 54 and 62, there is also formed a separating wall between them, which separating wall is defined by the inner wall 63 of the outer cavity 62 and the outer wall 56 of the inner cavity 54. This separating wall mates with the recess 46 between the inner and outer tubular elements 28 and 36.

In the arcing chamber 16 there is furthermore at least one vent opening 22, 24 in the same manner as in the first version of the breaking device, where a first group of axial vent openings 22 lead to the bottom of the inner cavity 54 and a first group of radial vent openings 24 lead to the inner cavity 54 via corresponding vent channels 58. It should here be realized that it is additionally or instead possible with a second group of radial vent openings 24 leading to the outer cavity 62 via corresponding vent channels.

Also, in this version there is an electrically conducting outer member 50, an electrically conducting inner member 52 in addition to the breaking member 26, where the inner member 52 is arranged radially inside the outer member 50 with respect to the breaking axis 25. The breaking member 26 is arranged radially between the outer member 50 and the inner member 52 with respect to the breaking axis 25.

Also in this example, each of the outer member 50 and the inner member 52 is an electrically conducting tube concentric with the breaking axis 25. Each of the outer member 50 and the inner member 52 has a circular cross-section. As the elements of the arc interrupting member are also tubular, the breaking device 10 is therefore a triaxial breaking device.

As shown in FIG. 5, also here, a space 59 is defined between the outer member 50 and the inner member 52. The space 59 is a space for an initial or starting position of the breaking member 26, where the breaking member rests when the circuit breaker is closed through the outer and inner members 50 and 52 being in electrical contact with each other. The breaking member 26 is moved from this space 59 into the arcing chamber 16 when moving from the starting position to the protruding position in order to interrupt an arc.

The majority of the breaking member receiving structure is also here made of the fifth electrically insulating material, which may be a polymer of any of the previously described types. It is additionally possible that also the end section 12 and the wall 14 are made of the same material. The fifth insulating material may thus be the same as the second insulating material.

Also here, a first part 60 of a cavity wall adjacent the first contact area of the electrically conducting outer member 50 may be made of a sixth insulating material having a higher thermal and wear resistance than the fifth insulating material. The first part 60 is in this case provided in the outer wall 64 of the outer cavity 62.

A second part 61 of a cavity wall adjacent the second contact area of the electrically conducting inner member 52 may also here be made of a seventh insulating material having a higher thermal and wear resistance than the fifth insulating material. The second part 61 is in this case provided in the inner wall 55 of the inner cavity 54.

It is also here possible that at least the inner wall 55 of the inner cavity 54 and the outer wall 64 of the outer cavity 62 is only made of the fifth insulating material, in which case there are no first and second parts. It is additionally possible that the inner wall 55 of the inner cavity 54 and/or the outer wall 64 of the outer cavity 62 is made of the fourth insulating material, where the sixth insulating material is provided as a coating on the outer wall 64 of the outer cavity 62 and/or the seventh insulating material is provided as a coating on the inner wall 55 of the inner cavity 54. It is furthermore possible that the inner wall 63 of the outer cavity 62 and the outer wall 56 of the inner cavity 54 receives the same treatment.

Both the sixth and seventh insulating materials may be the same as the first insulating material. They may thus also be refractory.

The space 59 may be defined by a wall. In this case it is furthermore possible that a part 65 of this wall located adjacent the first contact area of the electrically conducting outer member 50 is made of an eighth insulating material that is the same as the first insulating material. It may thus be a refractory material. The rest of the wall may be made of another insulating material, such as a polymer, like a polymer of any of the above-mentioned types.

Figure 6:
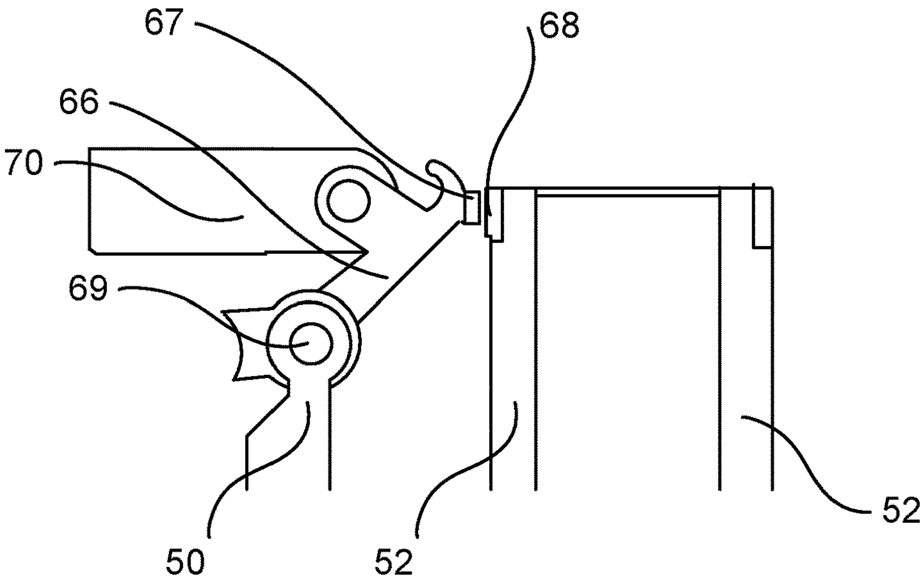
FIG. 6 schematically represents an enlarged partial view of a mechanism used for interconnecting an electrically conducting inner member with an electrically conducting outer member of the breaking device.

As can be seen in FIG. 6, the breaking device 10 further comprises a contact arrangement. The contact arrangement is configured to selectively electrically disconnect the outer member 50 and the inner member 52. The outer member 50 comprises an outer member tip that for this reason is equipped with a tap point 69.

There is also a moveable contact element 66 joined to outer member 50 at the tap point 69 and being pivotable around the tap point 69. The moveable contact element 66 comprises a first contact pad 67 and the inner member 52 comprises an inner member tip equipped with a second contact pad 68. When the breaking member is in the starting position the moveable contact element 66 covers the space 59 and the first contact pad 67 is in contact with the second contact pad 68. If the breaking member is moved to the protruding position, it pushes the moveable contact element 66 upwards and causes the contact element 66 to pivot in a first direction around the tap point 69. This in turn causes the contact pads 67 and 68 to be separated from each other. There is also a closing element 70 connected to the moveable contact element, which closing element 70 can be actuated to cause the contact element 66 to pivot in an opposite second direction around the tap point 69 for connecting the contact pads 67 and 68 to each other.

Each of the outer member tip and the inner member tip are positioned adjacent to the arcing chamber 16.

The first contact area may be made up of the outer member tip, possibly together with the moveable contact element 66 and the first contact pad 67, while the second contact area may be formed by the inner member tip with the second contact pad 68.

Figure 7:
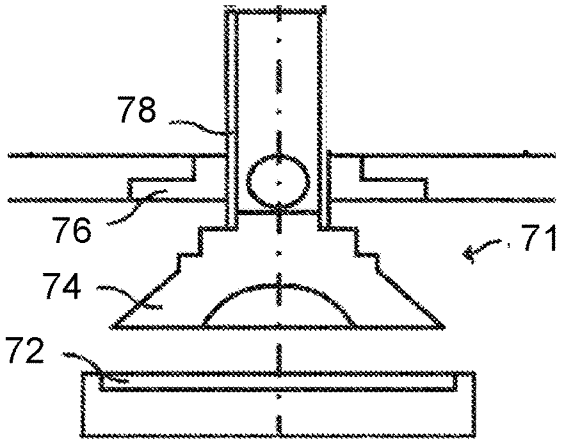
FIG. 7 schematically shows an actuator used for actuating the breaking member.

The breaking device 10 further comprises an actuator. The actuator may be of various types in order to force the breaking member 26 away from the starting position. One example of an actuator is schematically shown in FIG. 7. Here the actuator 71 is exemplified as a ballistic actuator in the form of a Thomson drive. The actuator 71 comprises a Thomson coil 72, an armature 74, an armature relaxing cushion 76, and an actuator tube 78 joined to the breaking member (not shown). The Thomson coil 72 and the armature 74 are arranged to provide energy to a ballistic movement of the breaking member 26.

Figure 8:
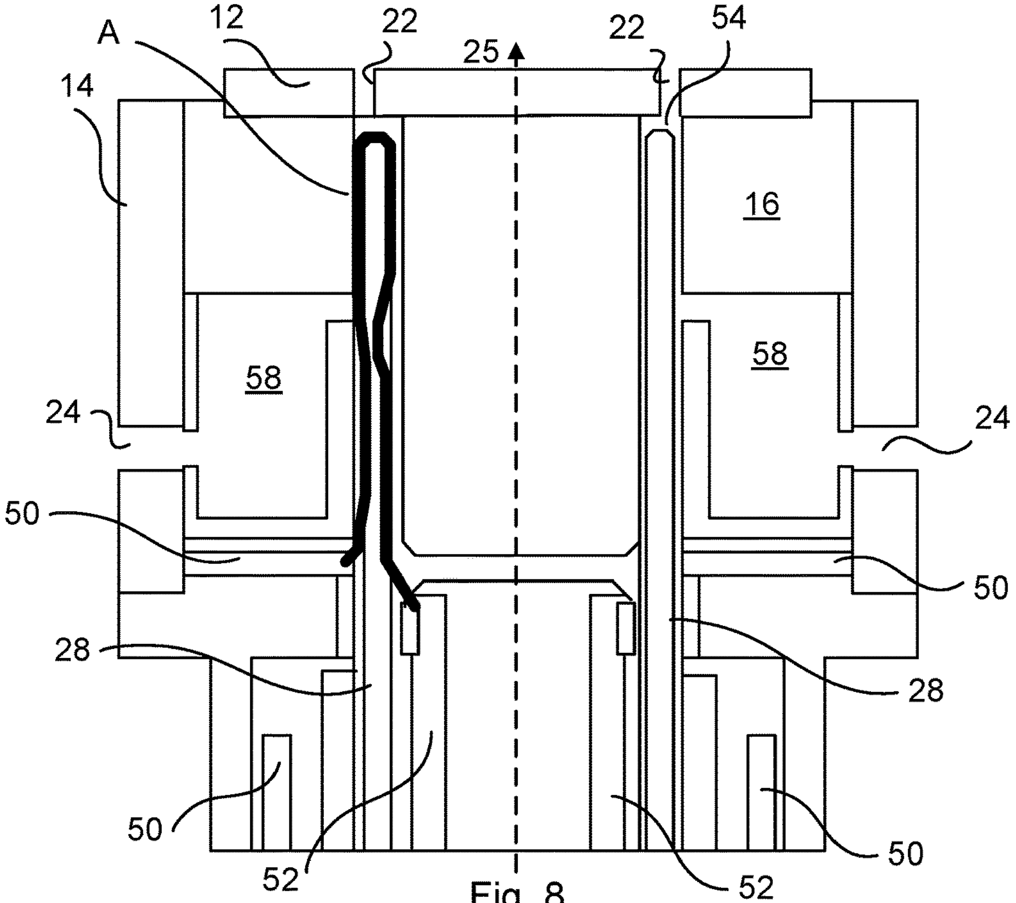
FIG. 8 schematically shows a cross-sectional side view of the breaking device according to the first embodiment during a current interruption action, and FIG. 9 schematically shows a cross-sectional side view of the breaking device according to the second embodiment during a current interruption action.

The operation of the breaking device according to the first embodiment will now be described with reference being made to FIG. 8, which shows the breaking member 26 in the process of being moved into the arcing chamber 16 when interrupting an arc A. In the figure the areas and parts with different materials have been omitted because these have no real influence on the operation.

The breaking member 26 is configured to move from the starting position along the breaking axis 25 in order to reach the protruded position.

The breaking member 26 thereby moves, by means of the actuator 71, from the starting position along the breaking axis 25 to the protruding position where the breaking member 26 protrudes into the arcing chamber 16.

Initially the breaking member 26 is in the starting position in which it is contained in the space 59 between the electrically conducting outer and inner members 50 and 52. Then when a current interruption is desired, the breaking member 26 is moved by the actuator 71 from the starting position along the breaking axis 25. At some point in time the first tubular element 28 will move the contacting element of the contact arrangement so that it is separated from the conducting inner member 52, thereby creating an arc A between the conducting outer and inner members 50 and 52.

The arc generates an overpressure within the arcing chamber 16. The overpressure is released by means of the vent openings 22 and 24. Furthermore, venting of the arcing chamber 16 through the vent openings 22, 24 takes place immediately when the breaking member 26 starts to move.

During the movement of the breaking member 26 from the starting position to the protruding position, the breaking member 26 thus pushes the moveable contact element 66 of the contact arrangement from the electrically connected state into an electrically disconnected state. The outer member 50 is thereby electrically disconnected from the inner member 52 and an arc A is ignited between the outer member 50 and the inner member 52. It should here be realized that the use of the breaking member 26 as a "pushing member" is however only one of several ways to electrically disconnect the outer member 50 and the inner member 52 by means of the contact arrangement.

The first tubular element 28 of the breaking member 26 will then start to enter the arcing chamber 16 and more particularly start to enter the first cavity 54 of the arcing chamber 16, where the first protruding end 30 is the first part of the first tubular element 28 that enters the arcing chamber 16. It is thus the part of the first tubular element 28 that first protrudes from the space 59 when moving from the starting position to the protruding position. This will extend the arc A between the inner and outer members 52 and 50 so that it also passes around the first protruding end 30.

As the breaking member 26 is continued to be moved along the breaking axis, more of the inner tubular element 28 will enter the first cavity 54. Thereby, the arc will go from the tip of the inner member 52, pass along the inner surface 32 of the first tubular element 28 around the first protruding end 30 and then back along the outer surface 34 of the first tubular element 28.

Finally, the breaking member 26 reaches the protruded position. In this case the first protruding end 30 has reached and abuts the bottom of the first cavity 54 thereby interrupting the arc. The first protruding end 30 of the first tubular element 28 thus abuts the bottom of the first cavity 54. Thereby the arc may get chopped and the current quenched.

The breaking member 26 may then be returned from the protruding position to the starting position for reuse of the breaking device 10. The return movement may for example be made manually or by means of the actuator 71 or the closing element 70 of the contact arrangement.

If operating a known breaking device through moving a breaking member with a first tubular element only comprising the second insulating material into a first cavity with walls only made of the fifth insulating material, where the second and fifth insulating materials are polymers, the generation of an arc causes material erosion of the breaking member as well as possibly also of the first cavity in the arcing chamber. The material erosion may be most prominent at the protruding end of the first tubular element but may also be significant at the entry point into the arcing chamber. This material erosion has a negative effect on the durability of the breaking device. It is in fact possible that the breaking device will fail to operate satisfactory after a relatively few numbers of operations, such as fifty.

Put differently, the arcing chamber initially builds enough arc voltage before the breaking member reaches full stroke inside the arcing chamber; because arc squeezing effect into the thin cavity between the breaking member and the surrounding walls, together with polymer ablation and arc elongation help to generate high arc voltage within relatively short travel distance of the breaking member.

- However, after dozens of operations (often 40 to 50 operations) the squeezing effect of electrical arc is gradually reduced, due to material loss at the polymeric parts, mainly at the top of the breaking member and also at the bottom of the arcing chamber. Therefore, the interruption time increases.
- As the operations continue, the performance of DC current interruption deteriorates until breaking failure occurs.

To ensure squeezing of the arc in the gap between the breaking member and the cavity side walls, the first cavity may need to remain sufficiently narrow even after hundreds of interruptions. However, also the polymeric ablation helps to increase the arc voltage.

Through providing the first insulating material that has a higher wear resistance and possibly also a higher thermal resistance in at least the first area of the first tubular element of the breaking member, the reliability is considerably increased, which reliability can be further enhanced by the provision of the sixth and/or seventh insulating materials also in the receiving structure.

Thus, at least at the most exposed and eroded regions the materials are exchanged from polymeric ones to robust refractory material. Those regions are the top of the first tubular element and the bottom of the arcing chamber and pepper can in the middle of the breaking member.

The refractory materials need to be dielectric and mechanical robust. To avoid cracking they also should have a high thermal shock resistance. As mentioned earlier, they could be for instance ceramics from the group of nitrides (e.g., BN, $Si_3N_4$) or oxides (e.g., $Al_2O_3$, $SiO_2$) or a silicate such as a calcium silicate or sodium silicate. As was also mentioned earlier the materials could also be cements, such as Portland or alumina cement, bonded mica sheets or reinforced with glass fibers, like continuous or short glass fibers.

The joining of refractory and polymeric material can be done with different shapes and layouts of the contact surfaces together with a structural adhesive to fill potential air gaps.

By sufficient reduction of the erosion rate at the critical regions, the size of the recess can be kept small enough over the lifetime of the arcing chamber. Thus, the arc will be sufficiently squeezed in the cavity, while the remaining polymeric part can still contribute to the arc quenching.

It can thus be seen that the insulating member (breaking member) is made of polymer and a refractory top part/coating to withstand erosion by the arc. Additionally, refractory parts/coatings at the bottom of the arcing chamber at the first cavity entrance can also be implemented to ensure gap size stability. Thus, the arc can be squeezed and elongated into the cavity between breaking member and cavity walls and finally interrupted.

The electric lifetime of the breaking device at nominal current is thereby improved. More robust, erosion resistant refractory materials are utilized on the top of the breaking member and the entrance of the arcing chamber. The erosion can be sufficiently decreased by implementation of a refractory material compared to the "all polymer solution", so that the cavity size is kept stable and small enough to squeeze and elongate the arc until interruption. Therefore, the proposed design with a combination of polymeric and refractory materials in the breaking member as well as inside the arcing chamber should have a longer electrical lifetime.

The first embodiment thus improves the total wear resistance of the breaking device.

Figure 9:
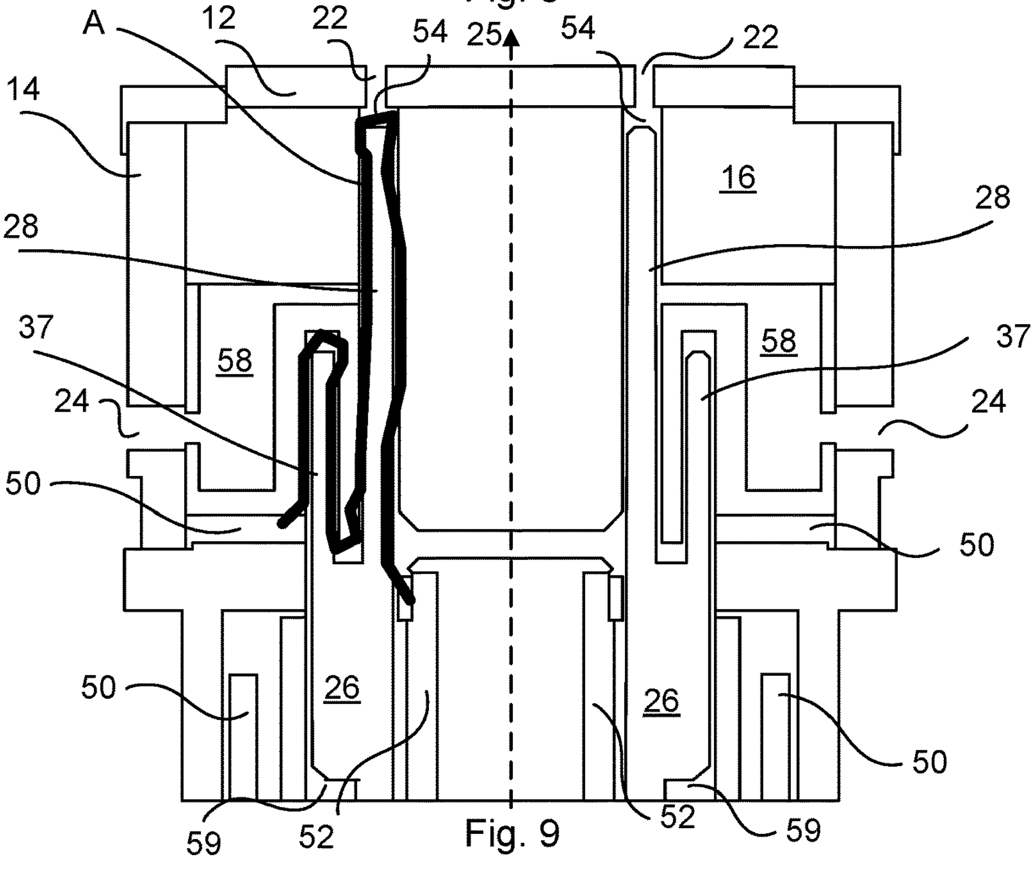

The operation of the breaking device according to the second embodiment when interrupting the current will now be discussed in relation to FIG. 9.

Also here, the breaking member 26 is configured to move from the starting position along the breaking axis 25 in order to reach the protruded position.

The breaking member 26 thereby moves, by means of the actuator 71, from the starting position along the breaking axis 25 to the protruding position where the breaking member 26 protrudes into the arcing chamber 16.

Initially the breaking member 26 is in the starting position in which it is contained in the space 59 between the electrically conducting outer and inner members 50 and 52. Then when a current interruption is desired, the breaking member 26 is moved by the actuator 71 from the starting position along the breaking axis 25. At some point in time the inner tubular element 28 will move the contacting element of the contact arrangement so that it is separated from the conducting inner member 52, thereby creating an arc A between the conducting outer and inner members 50 and 52.

During the movement of the breaking member 26 from the starting position to the protruding position, the breaking member 26 thus pushes the moveable contact element 66 of the contact arrangement from the electrically connected state into an electrically disconnected state, thereby electrically disconnecting the outer member 50 from the inner member 52 and an arc A is ignited between the outer member 50 and the inner member 52.

The inner tubular element 28 of the breaking member 26 will then start to enter the arcing chamber 16 and more particularly start to enter the inner cavity 54 of the arcing chamber 16 where again the first protruding end 30 is the first part of the inner tubular element 28 that enters the arcing chamber 16. It is thereby the part of the inner tubular element 28 that first protrudes from the space 59 when moving from the starting position to the protruding position. This will extend the arc A between the inner and outer members 52 and 50 so that it also passes around the first protruding end 30.

As the breaking member 26 is continued to be moved along the breaking axis 25, more of the inner tubular element 28 will enter the inner cavity 54. Thereby, the arc will go from the tip of the inner member 52, pass along the inner surface 32 of the inner tubular element 28 around the first protruding end 30 and then back along the outer surface 34 of the inner tubular element 28. If the outer tubular element 36 has not yet entered the arcing chamber the arc will thereafter continue to the tip of the outer member 50. The movement thus further extends or squeezes the arc A.

When movement continues along the breaking axis, the outer tubular element 37 then starts to enter the outer cavity 62, where the second protruding end 38 is the first part of the outer tubular element 37 that enters the arcing chamber 16. It is thus the part of the outer tubular element 37 that first protrudes from the space 59 when moving from the starting position to the protruding position. This will cause the arc A to go from the tip of the inner member 52, pass by the inner surface 32 of the inner tubular element 28, around the first protruding end 30, back along the outer surface 34 of the inner tubular element 28 into the recess 46 between the inner and outer tubular elements 28 and 37 around the tip of the wall separating the inner and outer cavities 54 and 62, continue along the inner surface 40 of the outer tubular element 37, turn around the second protruding end 38 and then continue along the outer surface 42 of the outer tubular element 37 and make contact with the tip of the outer member 50.

Finally, the breaking member 26 reaches the protruded position. In this case the first protruding end 30 has reached and abuts the bottom of the inner cavity 54, the second protruding end 38 has reached and abuts the bottom of the outer cavity 62 and the bottom of the recess 46 between the inner and outer tubular elements 28 and 37 has received and abuts the tip of the wall between the inner and outer cavity 54 and 62, thereby interrupting the arc. The first protruding end 30 of the inner tubular element 28 thus abuts the bottom of the inner cavity 54, the second protruding end 38 of the outer tubular element 37 abuts the bottom of the outer cavity and the bottom of the recess 46 abuts the tip of the wall separating the cavities 54 and 62. Thereby the arc may get chopped and the current quenched. As an alternative it is possible that only one or two of the breaking member parts, the first protruding end, second protruding end and bottom of the recess, actually abuts the corresponding part of the arcing chamber in the protruded position.

As is described above, the arc A is forced to move from the inner member 52, over the first and second protruding ends 30 and 38 of the breaking member 26, and back to the outer member 50. The breaking member 26 thereby lengthens the arc path between the outer member 50 and the inner member 52 and forces the arc to pass over this extended length.

That is, the breaking member 26 forces the arc to extend over a considerable distance, which distance corresponds to the sum of twice the first protruding length and twice the second protruding length. In some implementations, this stressing of the arc in the protruding position causes the arc to be extinguished. The protruding position thereby constitutes one position of the breaking member 26 for interrupting a current between the outer member 50 and the inner member 52 by means of the breaking member 26.

In the same way as in the first embodiment, the use of the first, third, sixth and seventh materials has the advantage of limiting material erosion. Additionally, the provision of the second tubular element in the breaking member has the advantage of extending the arc as compared with the first embodiment, which has a further positive influence of the wear. The wear resistance is thus even further enhanced by the use of two tubular elements instead of one. This is due to the fact that the arc is elongated.

Through the implementation of the breaking member as an inner and an outer second tubular element, the electric lifetime of the breaking device is improved compared with if only one tubular element is used.

Furthermore, through using a breaking member with an inner tubular element and an outer tubular element, it may be possible to build up an arc voltage in the arcing chamber that is higher than if only one tubular element is used. It may as an example be in the range 1.2-2.0 times higher depending on the length of the outer tubular element. Alternatively, the erosion of the tubular member is lowered. This can also be achieved with a minimal increase in the size of the breaking device.

The use of the breaking member with an inner tubular element and an outer tubular element thus provides an additional arc length and allows the building of a higher arc voltage, in order to allow a faster interruption of a DC current and to improve electric endurance at nominal current.

The voltage withstand capability of the breaking device 10 mainly depends on the stroke length of the breaking member 26. The current interruption capability mainly depends on the strength of the breaking member 26 to withstand the arc pressure. The length of the stroke, the speed of the breaking member 26, the thickness and length of the breaking member 26 etc. may be varied depending on implementation.

The protruding length of the outer tubular elements can be varied. The protruding length of the outer tubular element of the breaking member can be extended or reduced compared to the previously given example. Th second protruding end can be located closer to the first protruding end than to the joining area in relation to the breaking axis, i.e. the second plane with the second protruding end may be located closer to the first plane with the first protruding end than to the third plane with the bottom of the recess. Thereby the distance between the second plane and the first plane may be lower than the distance between the second plane and the third plane. Alternatively, the second protruding end can be located closer to the joining area than to the first protruding end in relation to the breaking axis, i.e. the second plane with the second protruding end may be located closer to the third plane with the bottom of the recess than to the first plane with the first protruding end. Thereby the distance between the second plane and the first plane may be higher than the distance between the second plane and the third plane.

While the present disclosure has been described with reference to exemplary embodiments, it will be appreciated that the present invention is not limited to what has been described above. For example, it will be appreciated that the dimensions of the parts may be varied as needed.

The invention claimed is:

1. A breaking device for interrupting current, the breaking device comprising:

an electrically conducting outer member;

an electrically conducting inner member arranged radially inside the outer member with respect to a breaking axis; and an electrically insulating or semiconducting breaking member arranged radially between the outer member and the inner member with respect to the breaking axis, the breaking member being arranged to move along the breaking axis from a starting position to a protruding position in which the breaking member protrudes from a space within the outer member for interrupting a current between the outer member and the inner member via the breaking member;

the breaking member comprising a first tubular element including a first insulating material and a second insulating material, where the first insulating material has a higher wear resistance than the second insulating material.

2. The breaking device according to claim 1, wherein the first insulating material is a refractory material, and the second insulating material is a polymer.

3. The breaking device according to claim 2, wherein the first insulating material is provided as a coating on the second insulating material.

4. The breaking device according to claim 2, wherein the first insulating material is provided in a first area of the first tubular element and the second insulating material is provided in a second area of the first tubular element.

5. The breaking device according to claim 2, wherein the breaking member comprises a second tubular element, where the first tubular element is an inner tubular element and the second tubular element is an outer tubular element joined to an outer surface of the inner tubular element, thereby defining a recess between the outer tubular element and the inner tubular element, where the outer tubular element includes a third and a fourth insulating material, where the third insulating material has a higher wear resistance than the fourth insulating material.

6. The breaking device according to claim 1, wherein the first insulating material is provided as a coating on the second insulating material.

7. The breaking device according to claim 1, wherein the first insulating material is provided in a first area of the first tubular element and the second insulating material is provided in a second area of the first tubular element.

8. The breaking device according to claim 7, wherein the first area covers a first part of the first tubular element including a first protruding end of the first tubular element, wherein the second area covers a second part of the first tubular element that forms a remainder of the first tubular element, and wherein the first protruding end is a part of the first tubular element that first protrudes from the space when moving from the starting position to the protruding position.

9. The breaking device according to claim 1, wherein the breaking member comprises a second tubular element, where the first tubular element is an inner tubular element and the second tubular element is an outer tubular element joined to an outer surface of the inner tubular element, thereby defining a recess between the outer tubular element and the inner tubular element, where the outer tubular element includes a third and a fourth insulating material, where the third insulating material has a higher wear resistance than the fourth insulating material.

10. The breaking device according to claim 9, wherein the first insulating material is same as the third insulating material, and wherein the second insulating material is same as the fourth insulating material.

11. The breaking device according to claim 9, wherein the first insulating material is provided as a coating on the second insulating material, and wherein the third insulating material is provided as a coating on the fourth insulating material.

12. The breaking device according to claim 9, wherein the first insulating material is provided in a first area of the first tubular element and the second insulating material is provided in a second area of the first tubular element, and wherein the third insulating material is provided in a third area of the outer tubular element and the fourth insulating material is provided in a fourth area of the outer tubular element.

13. The breaking device according to claim 12, wherein the third area covers a first part of the outer tubular element including a protruding end, and wherein the fourth area covers a second part of the outer tubular element covering a remainder of the outer tubular element, and wherein the protruding end is a part of the outer tubular element that first protrudes from the space when moving from the starting position to the protruding position.

14. The breaking device according to claim 1, further comprising an arcing chamber comprising a breaker element receiving structure including at least one cavity, each cavity having at least one wall and being provided for receiving a corresponding tubular element of the breaking member, wherein the at least one wall is made of a fifth insulating material and a sixth insulating material, and wherein the sixth insulating material has a higher wear resistance than the fifth insulating material.

15. The breaking device according to claim 14, wherein the fifth insulating material is same as the second insulating material and the sixth insulating material is same as the first insulating material.

16. The breaking device according to claim 14, wherein a first part of a cavity wall adjacent a first contact area of the electrically conducting outer member is of the sixth insulating material.

17. The breaking device according to claim 14, wherein a second part of a cavity wall adjacent a second contact area of the electrically conducting inner member is of a seventh insulating material having a higher wear resistance than the fifth insulating material.

18. The breaking device according to claim 17, wherein the seventh insulating material same as the first insulating material.

* * * * *